INVENTOR.
HERBERT STOPPER
BY
Lewis P. Elbinger

INVENTOR.
HERBERT STOPPER
BY

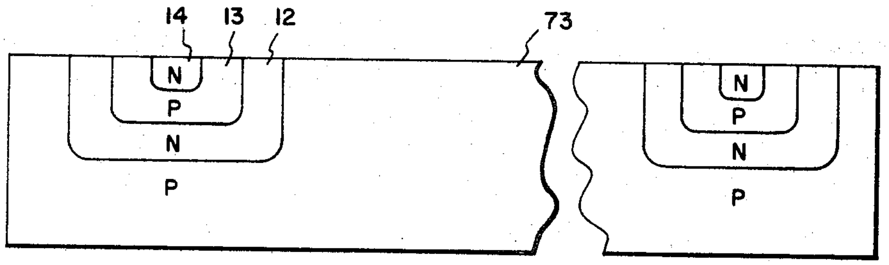
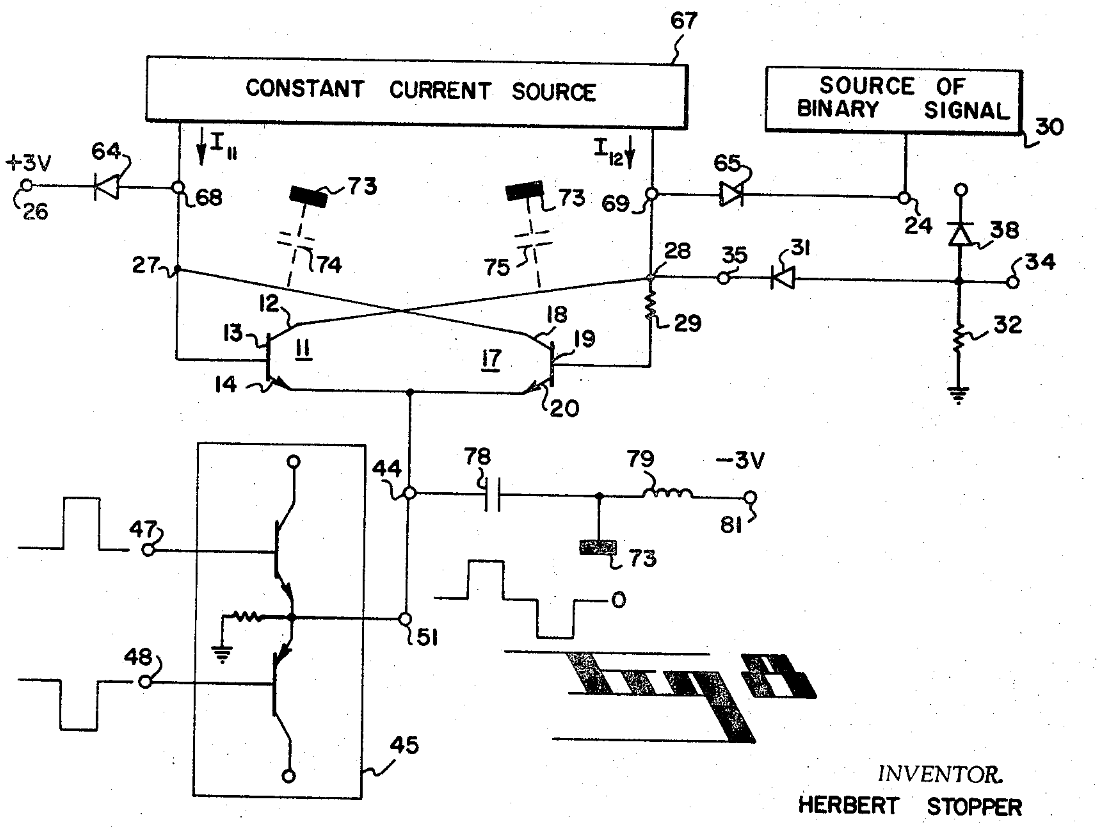
INVENTOR.
HERBERT STOPPER
BY
*[signature]*

United States Patent Office 3,421,026
Patented Jan. 7, 1969

3,421,026

MEMORY FLIP-FLOP

Herbert Stopper, Phoenix, Ariz., assignor to General Electric Company, a corporation of New York Filed June 29, 1964, Ser. No. 378,726
U.S. Cl. 307—289 23 Claims
Int. Cl. H03k 3/26

ABSTRACT OF THE DISCLOSURE

A pair of transistors are cross-coupled to form a memory flip-flop. The emitters of the transistors are coupled to a source of synchronizing pulses and the collector of one of the transistors is coupled to a source of data signals.

This invention relates to bistable devices and more particularly to high-speed flip-flops which are especially useful as memory elements in an electronic data processing system.

A prior art flip-flop is a bistable circuit which operates in either one of two stable states and has two signal input terminals, each of which corresponds with one of the two states. The flip-flop remains operating in either state until transferred to the other state by application of a trigger signal to the corresponding terminal. In one state of operation the flip-flop represents the binary 1 (1 state) and in the other state the binary 0 (0 state).

An important application of the flip-flop is its use as a memory or data storage device in electronic data processing systems. Buffer memories provide temporary storage for data words being transferred to a main memory from a peripheral device, such as a magnetic tape handler. Flip-flops are especially useful in buffer memories where it is desired that data words be "written" into the buffer memory and "read" out of the buffer memory in a very short period of time. Each flip-flop stores an element of information representing a binary digit, the binary digit being termed a "bit." A data word is composed of several bits. Each bit is either a binary 0 or a binary 1.

It is desirable, in electronic data processing systems that data be written into the buffer memory and read out of the buffer memory only during the time of a synchronizing pulse. Thus, buffer memories employing prior art flip-flops require, in addition, a pair of input Coincidence-gates and a pair of output Coincidence-gates, for each flip-flop. These Coincidence-gates used in prior art circuits prevent a bit from being written into a flip-flop, or read out of a flip-flop until a synchronizing pulse is applied to one of the Coincidence-gates. Such circuits, however, caused the memory to be bulky and expensive to construct. It is desirable, therefore, to provide an improved high-speed memory having a greatly simplified circuit construction.

It is, therefore, the principal object of this invention to provide an improved high-speed memory circuit.

Another object is to provide an improved and greatly simplified memory circuit.

Another object is to provide a simplified memory circuit which combines the function of a flip-flop, a pair of input Coincidence-gates and a pair of output Coincidence-gates.

The foregoing objects are achieved in a flip-flop circuit employing two transistors. The transistors are cross-coupled to each other and the emitter of each transistor is connected to a terminal which receives synchronizing or "clock" pulses. The collector of the first of these transistors is coupled to a suitable source of reference voltage. The collector of the second of these transistors is coupled to a terminal which receives a signal which represents data. This signal represents a binary 1 or a binary 0 in accordance with its voltage relationship to the reference voltage. The value of the reference voltage and the value of the clock pulse are selected so that the combination of the signal and a positive clock pulse applied simultaneously to the flip-flop sets the flip-flop to a state which represents that of the signal. A diode is connected between the collector of the second transistor and an output terminal. A negative clock pulse applied to the emitters of the transistors causes a voltage representing the state of the flip-flop to be present at the output terminal. Thus, the two transistors which are employed in the flip-flop also provide an input gating function and an output gating function. Furthermore, the instant invention has but one signal input terminal instead of the two signal input terminals required in prior art flip-flops of the class defined above.

Other objects and advantages of the invention will become apparent from the following detailed description when taken in connection with the accompanying drawings, wherein:

FIG. 7 illustrates details of circuit construction; and

FIG. 8 is a circuit diagram of another embodiment of the instant invention.

It is desired that data be "written" into a flip-flop or "read" out of a flip-flop only during the time of occurrence of a clock pulse. A clock pulse is a synchronizing pulse having a short time duration.

At a given point in an electronic data processing system any two different voltages can be used to represent a binary 1 and a binary 0. At one point in the system a +4 volts may represent a binary 1 and a +2 volts may represent a binary 0. At another point in the system a −.5 volt may represent a binary 1 and a −2.1 volts may represent a binary 0. It is required that the two voltages have enough difference so that a voltage which represents a binary 1 and a voltage which represents a binary 0 can be easily distinguished one from the other by an electronic circuit. The more positive signal, however, normally represents the binary 1.

Figure 1:
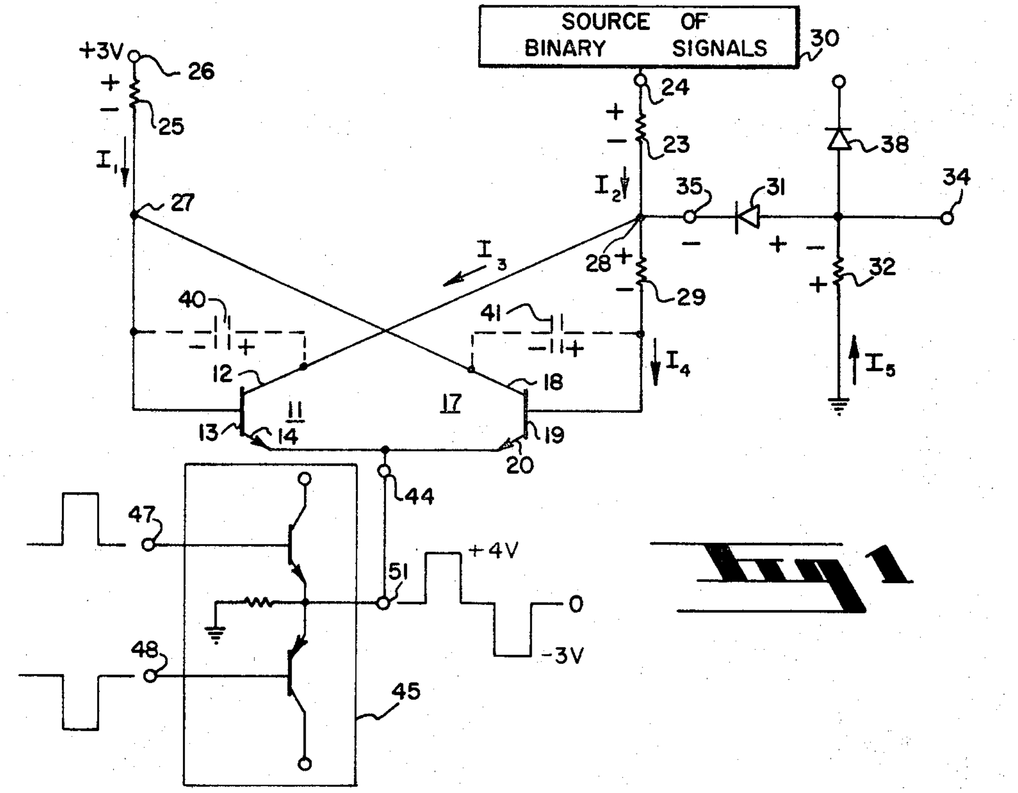
FIG. 1 is a circuit diagram of one embodiment of the instant invention.

The memory flip-flop of FIG. 1 provides the gating and data storage functions which are provided by the flip-flop and gates employed in prior art circuits. A binary 0 or a binary 1 can be written into the memory flip-flop of FIG. 1 only during the time of a positive clock pulse. The stored bit can be read out only during the time of a negative clock pulse. The memory flip-flop comprises a transistor 11 having a collector 12, a base 13 and an emitter 14 and a transistor 17 having a collector 18, a base 19 and an emitter 20. Collector 18 is connected to base 13 of transistor 11. A resistor 23 is connected between collector 12 and a data-input terminal 24. A resistor 25 is connected between collector 18 and a terminal 26. Resistors 23 and 25 each have a value of approximately 500 ohms. Terminal 26 is connected to a suitable reference voltage such as +3 volts. A resistor 29 is connected between collector 12 and base 19. Resistor 29 has a value of approximately 100 ohms.

A diode 31 and a resistor 32 form part of an AND-gate. An AND-gate provides the logical operation of conjunction for positive input signals applied thereto. The AND-gate is a circuit which has two or more input terminals and an output terminal. The AND-gate provides a positive output signal, representing a binary 1, only when all of the signals applied to the input terminals represent binary 1's. When one or more of the signals applied to the input terminals represent a binary 0, the AND-gate provides an output signal representing a binary 0. Diode 31 is connected between a terminal 34 and a terminal 35 which is connected to collector 12. Resistor 32 is connected between terminal 34 and a source of reference voltage such as ground. Other diodes can each be connected between terminal 34 and the collector of a transistor of another flip-flop so that when a voltage representing a binary 1 is present at the collectors of all transistors to which these diodes are connected, a voltage representing a binary 1 will be present at terminal 34 during the time of occurrence of a negative clock pulse. One such diode is shown in FIG. 1 as a diode 38. If a voltage representing a binary 0 is present at the collector of any transistor to which these diodes are connected, a voltage representing a binary 0 will be present at terminal 42 during the time of a negative clock pulse. Thus, diode 31 and resistor 32 can be combined with other diodes to form an AND-gate.

Due to the physical arrangement of the elements in a transistor, a distributed capacitance exists, inside the transistor, between the collector and the base of each transistor such as those used in FIG. 1. Distributed capacitance between the collector and the base of transistors 11 and 17 are represented by the dashed leads and the dashed configuration of capacitors 40 and 41. This capacitance provides storage of electrical charges during operation of the circuit.

Clock pulses which are employed to synchronize the writing of data into the flip-flop and clock pulses which are employed to synchronize the reading of data out of the flip-flop are applied to a clock pulse terminal 44. A merging circuit 45 receives positive clock pulses at an input terminal 47 and receives negative clock pulses at an input terminal 48. The positive and negative clock pulses are combined by circuit 45 and delivered at an output terminal 51. These combined clock pulses result in a three-level clock signal as shown by the waveform opposite terminal 51 of FIG. 1. Prior art flip-flops employ a two-level clock signal which is applied to the aforementioned gate circuits.

Semiconductor materials used in transistors, such as the transistors which are employed in the flip-flop of FIG. 1, store electrical charges during the time a transistor is in a conductive condition. These charges must be supplied to a transistor in order to render the transistor conductive. These electrical charges must be removed to render a transistor nonconductive after it has been conductive. Electrical current flowing into the base of a transistor supplies electrical charges to the transistor. Electrical current flowing out of the base of a transistor removes these electrical charges from the transistor.

Figures 2, 3, 4:
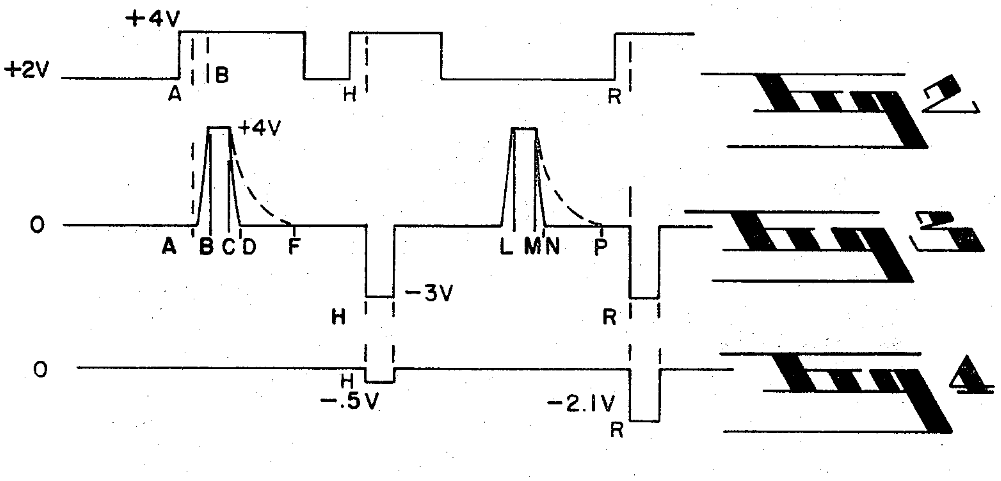
FIGS. 2, 3 and 4 illustrate waveforms useful in explaining the operation of the instant invention.

In FIG. 1 binary data to be written into the memory flip-flop is supplied by an input signal delivered by source 30. This input signal is represented by the waveform shown in FIG. 2. A binary 0 is represented by a +2 volts and a binary 1 is represented by a +4 volts. This signal of FIG. 2 is applied to data-input terminal 24. The reference voltage at terminal 26 must have a value which is substantially midway between the voltage which represents a binary 0 at terminal 24 and the voltage which represents a binary 1 at terminal 24. Clock pulses used to synchronize writing data into and reading data out of the flip-flop are shown by the waveform of FIG. 3. A "write-in" or a "clock-in" pulse is represented by a +4 volts and a "read-out" pulse is represented by a −3 volts. The clock pulse signal shown in FIG. 3 is applied to clock-pulse terminal 44. The clock-in pulse must have a voltage at least as positive as the maximum positive voltage in all other parts of the circuit so that the flip-flop will be transferred to the desired state. The signal at output terminal 34 is shown in FIG. 4.

A second source of binary signals can be coupled to terminal 26 instead of the reference voltage shown in FIG. 1. The proper combination of binary signals at terminals 24 and 26 and a positive clock pulse at terminal 44 applied simultaneously to the flip-flop sets the flip-flop to the desired state.

When the flip-flop is in the 0-state, transistor 11 is conducting and transistor 17 is nonconducting. When the flip-flop is in the 1-state, transistor 17 is conducting and transistor 11 is nonconducting. Assume at time A (FIGS. 2 and 3) that the flip-flop is in the 0-state. A current $I_1$ flows from terminal 26, through resistor 25, through base 13 and emitter 14 to terminal 44. Current $I_1$ maintains transistor 11 conductive so that a relatively large current flows from terminal 24 through resistor 23, through collector 12 and emitter 14 to terminal 44. Current through resistor 23 provides the voltage polarities shown across resistor 23. The value of the voltage at junction point 28 is less than the value of the voltage at terminal 24 by the amount of the voltage drop across resistor 23. This voltage drop across resistor 23 provides a voltage at junction point 28 that is approximately +.3 volt when the voltage at terminal 44 has a zero value. The voltage at base 19 is also approximately +.3 volt. A typical transistor requires approximately +.9 volt between base and emitter to cause current to flow into the base. The voltage between base 19 and emitter 20, however, is only .3 volt and, therefore is less than the voltage required to render transistor 17 conductive. Thus, transistor 17 is maintained in a nonconductive condition until the voltage at terminal 44 changes. The connection between base 13 and collector 18 and the connection between base 19 and collector 12 provide a cross-coupling means for the flip-flop so that when one transistor conducts the other does not conduct.

At time B the +4 volt clock pulse at terminal 44 and the +4 volts representing a binary 1 at terminal 24 cause the flip-flop to change to the 1-state. The clock pulse voltage supplied to terminal 44 and applied to emitter 14 is more positive than the voltage at terminal 26 and base 13 so that current $I_1$ no longer flows from base to emitter of transistaor 11. The voltage at terminal 24 is now more positive than the voltage at terminal 26, causing a current $I_2$ to flow from terminal 24 to terminal 26. Current $I_2$ flows from terminal 24 through resistor 23 to junction point 28 where it divides. A current $I_3$ flows from junction point 28 through collector 12 and base 13, and through resistor 25 to terminal 26. Current $I_3$ which thus flows out of the base 13 removes electrical charges from transistor 11. Current $I_3$ also provides a charge on the capacitance represented by capacitor 40 of the polarity shown in FIG. 1 so that transistor 11 will continue to be nonconductive when the voltage at terminal 44 returns to a zero value. Also at time B, a current $I_4$ flows from junction point 28 through resistor 29, through base 19, and collector 18, and through resistor 25 to terminal 26. Current $I_4$ provides electrical charges which are stored in transistor 17 and also provides a charge on capacitor 41 of the polarity shown in FIG. 1. These charges cause transistor 17 to become conductive so that the flip-flop will operate in the 1-state when the voltage at terminal 44 returns to a zero value.

If the clock-in pulse returns rapidly to a zero voltage value as shown between time C and time D (FIG. 3), the electrical charges in transistor 17 and the charges on capacitor 41 cooperate to transfer transistor 17 to the conductive state. The charge on the distributed capacitance represented by capacitor 41 causes a current to flow from the right side of capacitor 41 into base 19, to collector 18 and to the left side of capacitor 41. This current into the base supplies additional electrical charges which cause transistor 17 to be conductive. However, the charge on capacitor 40 opposes current flow into base 13 of transistor 11. This causes transistor 11 to remain nonconductive. The flip-flop will now operate in the 1-state.

Prior art flip-flop change from one binary state to the other binary state when a trigger signal is applied to the base of one of the transistors. The flip-flop of the instant invention changes from one binary state to a state in which neither transistor is conductive while a clock-in pulse is applied to emitters 14 and 20. Charges stored in one of the transistors and in the distributed capacitance cause the flip-flop to operate in the desired binary state when the clock-in pulse is no longer applied to emitters 14 and 20.

However, even though the clock-in pulse returns more slowly to a zero voltage as shown by the dotted curve between times C and F (FIG. 3), the flip-flop will operate in the 1-state. Typical transistors used in the circuit of FIG. 1 require a voltage of approximately +.9 volt between base and emitter to cause current to flow into the base. At the time the clock-in pulse drops to a value of +3 volts the +4 volts at terminal 24 causes a current to flow from terminal 24 through resistors 23 and 29, base 19 and emitter 20 to terminal 44 thereby rendering transistor 17 conductive. The +3 volts at terminal 26 is equal to the voltage at terminal 44 so that no current flows into the base of transistor 11. Transistor 11 remains nonconductive. As the voltage at terminal 44 decreases toward a zero value, current continues to flow from terminal 24 through resistors 23 and 29, base 19 and emitter 20 to terminal 44 so transistor 17 remains conductive. Another current flows from terminal 26 through resistor 25 and collector 18 to emitter 20 of transistor 17 to terminal 44. This current provides the relative voltage polarities shown across resistor 25 and reduces the voltage at junction point 27 and base 13 to approximately +.3 volt at time F. This is less than the .9 volt required between base 13 and emitter 14 to cause current to flow into base 13 so that transistor 11 remains nonconductive.

Thus, it has been shown that regardless of whether the clock-in pulse returns rapidly or more slowly to a zero voltage, the flip-flop operates in the 1-state following the clock-in pulse when the voltage applied to the data-input terminal represents a binary 1. Furthermore, the distributed capacitances, which hinder circuit operation in prior art circuits by storing charges and reducing operating speed, are utilized in the instant invention to aid in setting the flip-flop to the desired binary state when the clock pulse returns rapidly to a zero value.

To read out a bit which is stored in the flip-flop, a read-out pulse of −3 volts is applied to terminal 44. If a binanry 1 is stored and a read-out pulse is applied as shown at time H (FIGS. 2, 3 and 4), a small current $I_5$ flows from ground through resistor 32, diode 31, to junction point 28. A larger current $I_2$ flows from terminal 24 through resistor 23 to junction point 28. Current $I_4$ flows through resistor 29 and base 19 to emitter 20 of transistor 17 to terminal 44. Current $I_4$ provides the relative voltage polarities shown across resistor 29. The voltage drop across resistor 29 is approximately 1 volt. The voltage drop between base 19 and emitter 20 is approximately .9 volt. The value of the voltage at junction point 28 is more positive than the value of the voltage at terminal 44 by the amount of the voltage drop across resistor 29 and the voltage drop between base 19 and emitter 20 so that the voltage at junction point 28 is approximately −1.1 volts. Current $I_5$ provides the relative voltage polarities shown across diode 31. This voltage drop across diode 31 is approximately .6 volt. The value of the voltage at terminal 34 is more positive than the value of the voltage at junction point 28 by the amount of the voltage drop across diode 31 so that the voltage at terminal 34 is approximately −.5 volt as shown in FIG. 4.

At time L the +4 volt clock pulse at terminal 44 and the +2 volts representing a binary 0 at terminal 24 cause the flip-flop to change to the 0-state. The clock pulse voltage supplied to terminal 44 and applied to emitter 20 is more positive than the voltage at terminal 24 and base 19 so that current $I_4$ no longer flows from base to emitter of transistor 17. The voltage at terminal 26 is more positive than the voltage at terminal 24, causing a current to flow from terminal 26 to terminal 24. Current $I_1$ now flows to junction point 27 where it divides. A current $I_7$ flows from junction point 27 through collector 18 and base 19, through resistor 29 and resistor 23 to terminal 24. Current $I_7$ which flows out of base 19 removes electrical charges from transistor 17 and also provides a charge on the distributed capacitance represented by capacitor 41 opposite to the polarity shown in FIG. 1 so that transistor 17 will continue to be nonconductive when the voltage at terminal 44 returns to a zero value. Also at time L, a current $I_8$ flows from junction point 27 through base 13 and collector 12 through resistor 23 to terminal 24. Current $I_8$ provides electrical charges which are stored in transistor 11 and also provides a charge on the distributed capacitance represented by capacitor 40 having a polarity opposite to the polarity shown in FIG. 1. These charges cause transistor 11 to become conductive so that the flip-flop will operate in the 0-state when the voltage at terminal 44 returns to a zero value.

In the manner described hereinbefore, the transistor in which charges are stored during the presence of the positive clock pulse will be conductive when the clock-in pulse returns to a zero voltage value. If the clock-in pulse returns rapidly to a zero voltage at time N (FIG. 3), the electrical charges in the transistor and the charges on the distributed capacitance represented by capacitor 40 cooperate to transfer transistor 11 to the conductive state. If the clock-in pulse returns more slowly to a zero voltage between time M and time P (FIG. 3), transistor 11 will be conductive because the voltage at junction point 27 is more positive than the voltage at junction point 28. Thus, when a clock-in pulse is applied to the clock-input terminal and a bit representing a binary 0 is applied to the data-input terminal, the flip-flop is transferred to the 0-state.

If a binary 0 is stored in the flip-flop at the time a read-out pulse is applied as shown at time R (FIGS. 2, 3 and 4), a current $I_5$ flows from ground through resistor 32, diode 31 and collector 12 to emitter 14 of transistor 11 to terminal 44. Current $I_5$ provides a voltage drop across diode 31 and transistor 11. The total voltage drop across transistor 11 and diode 31 is approximately .9 volt. The value of the voltage at output terminal 34 is less negative than the value of the voltage at terminal 44 by the amount of voltage drop across transistor 11 and diode 31 so that the voltage at terminal 34 is approximately −2.1 volts as shown in FIG. 4. Thus, it has been shown that if a read-out pulse is applied to terminal 44 when the flip-flop is in the 1-state, the voltage at terminal 34 is less negative than the voltage at terminal 34 when the flip-flop is in the 0-state.

FIGS. 2 and 3 show the read-out pulses at time H and time R being applied to terminal 44 when a +4 volts is applied to terminal 24. Inasmuch as the voltage drop across a conducting transistor is essentially constant for a wide range of current values, the voltage at terminal 34 will not change appreciably if the voltage representing binary data input is a +2 volts rather than a +4 volts during read-out time. The level of the signal voltage at terminal 34 is dependent upon the bit stored in the flip-flop and not upon the input signal at terminal 24.

Thus, it has been shown that the prior art memory circuit having a flip-flop and a plurality of input gates and output gates has been replaced by a novel flip-flop circuit having its own gating functions.

Figures 5, 6:
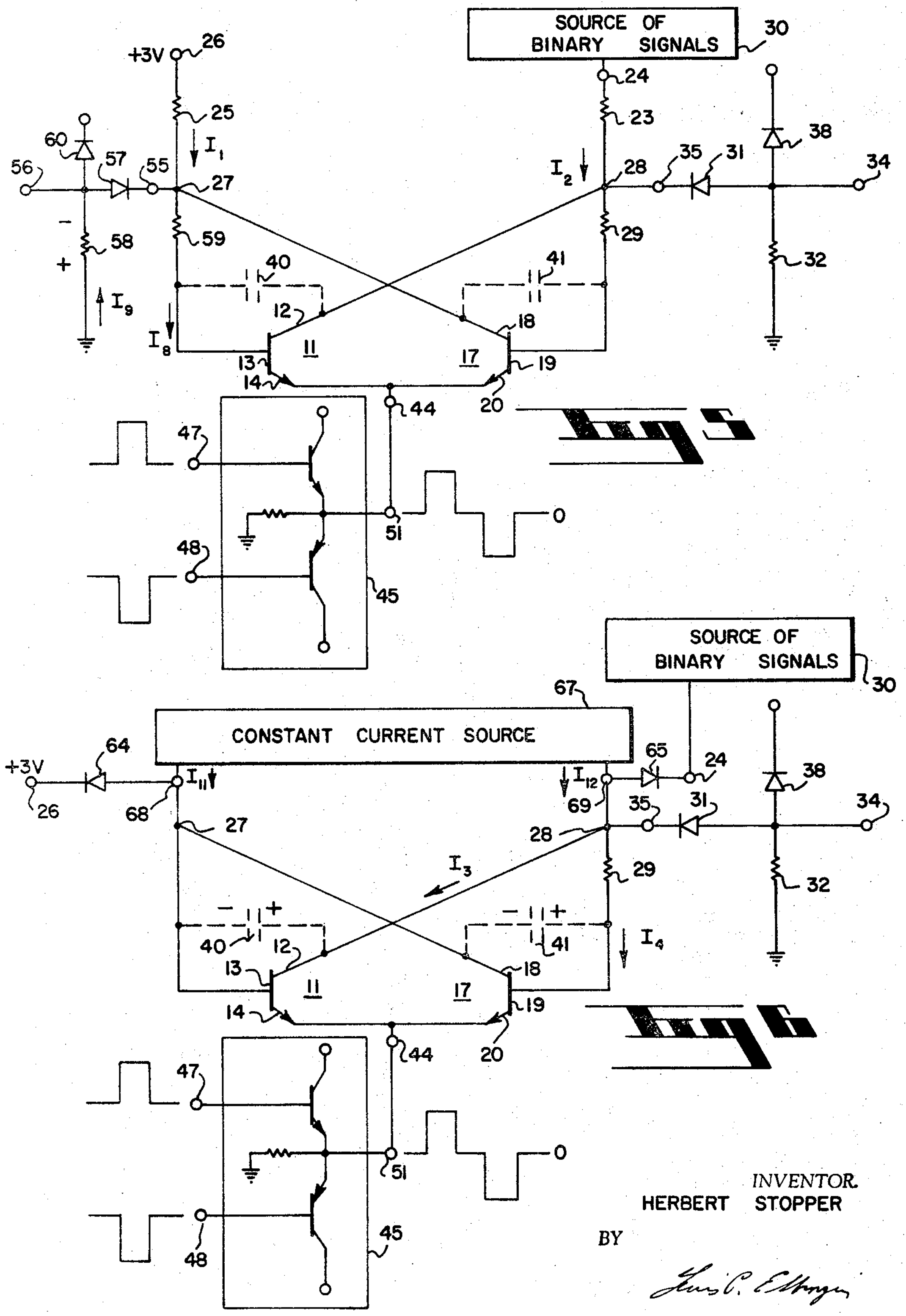
FIG. 5 is a circuit diagram of another embodiment of the instant invention.
FIG. 6 is a circuit diagram of another embodiment of the instant invention.

In certain applications, it is desirable to obtain a complementary signal at an output terminal of the flip-flop. The complementary signal provides a voltage representing a binary 1 when the flip-flop is in the 0-state and provides a voltage representing a binary 0 when the flip-flop is in the 1-state. FIG. 5 illustrates another embodiment of the circuit shown in FIG. 1 wherein like parts have similar reference characters. The circuit in FIG. 5 differs from the circuit shown in FIG. 1 in that a pair of terminals 55 and 56, a diode 57 and a pair of resistors 58 and 59 have been added to the circuit of FIG. 1 so that a complementary signal can be obtained from the memory flip-flop. Terminal 55 is connected to collector 18 of transistor 17. Diode 57 and resistor 58 form part of an AND-gate. Other diodes can each be connected between terminal 56 and the collector of a transistor of another flip-flop so that when all flip-flops to which these diodes are connected are in the 0-state, a binary 1 will be present at terminal 56. One such diode is shown in FIG. 5 as a diode 57. Diode 57 is connected between terminal 55 and terminal 56. Resistor 58 is connected between terminal 56 and a source of reference potential such as ground. Resistor 59 is connected between terminal 55 and base 13 of transistor 11.

Binary data is written into the flip-flop in the manner described herein in the operation of the circuit of FIG. 1. A binary 1 or a binary 0 which is stored in the flip-flop is also read out of terminal 34 as described hereinbefore.

Binary data is also read out of the flip-flop in the manner described in the operation of the circuit of FIG. 1. To read out a binary 0 or a binary 1 from terminal 56 a read-out pulse of —3 volts is applied to terminal 44 at time H. When the flip-flop is in the 1-state, transistor 17 will be conductive and transistor 11 nonconductive as described hereinbefore. At time H (FIGS. 2, 3 and 4), a current $I_9$ flows from ground through resistor 58, diode 57 and collector 18 to emitter 20 of transistor 17 to terminal 44. Current $I_9$ provides a voltage drop across each of the components through which $I_9$ flows. The total voltage drop across transistor 17 and diode 57 is approximately .9 volt. The value of the voltage at output terminal 56 is less negative than the value of the voltage at terminal 44 by the amount of the voltage drop across transistor 17 and diode 57 so that the voltage at terminal 56 is approximately —2.1 volts.

When the flip-flop is in the 0-state, transistor 17 will be nonconductive and transistor 11 will be conductive. If a read-out pulse of —3 volts is applied to terminal 44 at time R (FIGS. 2, 3 and 4), a small current $I_9$ flows from ground through resistor 58, diode 57 to junction point 27. A larger current $I_1$ flows from terminal 26 through resistor 25 to junction point 27. Current $I_8$ flows through resistor 59 and base 13 to emitter 14 of transistor 11 to terminal 44. Current $I_9$ provides the voltage polarities shown on resistor 58. This voltage drop across resistor 58 is approximately —.5 volt; therefore, the voltage at output terminal 56 is —.5 volt.

Thus, it can be seen that the voltage at terminal 56 is the complement of the voltage at terminal 34. When the flip-flop is in the 0-state, the voltage at terminal 56 is less negative than the voltage at terminal 56 when the flip-flop is in the 1-state.

FIG. 6 illustrates another embodiment of the circuit of FIG. 1. The circuit in FIG. 6 differs from the circuit shown in FIG. 1 in that resistors 23 and 25 have been replaced by a pair of diodes 64 and 65 and a constant current source 67 having current-output terminals 68 and 69. Diode 64 is connected between terminal 26 and terminal 68. Diode 65 is connected between terminal 24 and terminal 69. Source 67 supplies a current $I_{11}$ to terminal 68 which is connected to collector 18. Source 67 supplies a current $I_{12}$ to terminal 69 which is connected to collector 12 of transistor 11. Currents $I_{11}$ and $I_{12}$ each have a constant value. The value of current $I_{11}$ is chosen so that all of current $I_{11}$ flows from terminal 68 through base 13 and emitter 14 to terminal 44 when the flip-flop is in the 0-state, and all of $I_{11}$ flows from terminal 68 through collector 18 and emitter 20 to terminal 44 when the flip-flop is in the 1-state. The value of current $I_{12}$ is chosen so that all of current $I_{12}$ flows from terminal 69 through collector 12 and emitter 14 to terminal 44 when the flip-flop is in the 0-state, and all of $I_{12}$ flows from terminal 69 through resistor 29, base 19 and emitter 20 to terminal 44 when the flip-flop is in the 1-state. Current flows through diodes 64 and 65 only during the time a clock-in pulse is applied to terminal 44.

The operation of the circuit of FIG. 6 will now be described with reference to the waveforms shown in FIGS. 2, 3 and 4. Assume at time A, that the flip-flop is in the 0-state so that transistor 11 is conducting and transistor 17 is not conducting. Current $I_{11}$ flows from source 67 to terminal 68, from terminal 68 through base 13 to emitter 14 of transistor 11 to terminal 44. Current $I_{11}$ maintains transistor 11 conductive so that current $I_{12}$ flows from terminal 69 through collector 12 and emitter 14 of transistor 11 to terminal 44. Current $I_{12}$ provides a voltage drop of approximately .3 voltage between collector 12 and emitter 14 of transistor 11. The value of the voltage at junction point 28 and base 19 is also approximately +.3 volt. The voltage at terminal 44 is a zero value. The voltage between base 19 and emitter 20 is also approximately +.3 volt. This is less than the .9 volt required between base and emitter to cause current to flow into base 19 so that transistor 17 remains nonconductive. Thus, transistor 17 is maintained in a nonconductive condition until the voltage at terminal 44 changes. Diodes 31, 64 and 65 are in a nonconductive condition.

At time B, the +4 volts representing a binary 1 at terminal 24 and the +4 volt clock pulse at terminal 44 cause the flip-flop to change to the 1-state. The voltage at terminal 26 is less positive than the voltage at any other terminal in the circuit so all currents flow toward terminal 26. Current $I_{11}$ flows from terminal 68 through diode 64 to terminal 26. Current $I_{12}$ flows from terminal 69 to junction point 28. Current $I_3$ flows from junction point 28 through collector 12 to base 13 of transistor 11 and diode 64 to terminal 26. Current $I_3$ removes electrical charges from transistor 11 and charges the distributed capacitance represented by capacitor 40 to the polarity shown in FIG. 6 so that transistor 11 will continue to be nonconductive when the voltage at terminal 44 returns to a zero value. Also at time B, a current $I_4$ flows from junction point 28 through resistor 29, into base 19, to collector 18 of transistor 17, through diode 64 to terminal 26. Current $I_4$ provides electrical charges which are stored in transistor 17 and also provides a charge on the distributed capacitance represented by capacitor 41 of the polarity shown. These charges cause transistor 17 to become conductive so that the flip-flop will operate in the 1-state when the voltage at terminal 44 returns to a zero value.

In the circuit of FIG. 6, current $I_3$, which removes charges to render transistor 11 nonconductive, and current $I_4$, which supplies charges to render transistor 17 conductive, each have a greater amplitude than corresponding currents $I_3$ and $I_4$ shown in FIG. 1. In the circuit of FIG. 1, currents $I_3$ and $I_4$ are limited in amplitude by resistors 23 and 25 which have been removed in the circuit of FIG. 6. Increasing the amplitude of $I_3$ and $I_4$ decreases the time required to supply sufficient charges so that the flip-flop can more quickly change from the 0-state to the 1-state. At time L, current flowing into base 13 of transistor 11 and current out of base 19 of transistor 17 of FIG. 6 each has a greater amplitude than corresponding currents described hereinbefore in the description of the operation of FIG. 1. The flip-flop can more quickly change to the 0-state. Thus, in the circuit of FIG. 6, electrical charges are removed more rapidly or supplied more rapidly to transistors 11 and 17 than in the circuit shown in FIG. 1. Clock pulses having a shorter time duration can be used as less time is required to supply sufficient charges to render one transistor conductive and less time is required to remove sufficient charges to render the other transistor nonconductive. Thus, the circuit shown in FIG. 6 can operate at a higher frequency than the circuit shown in FIG. 1.

A binary 0 or a binary 1 is read out of the circuit of FIG. 6 in a manner similar to that described hereinbefore in the description of the operation of the circuit of FIG. 1.

The circuit of the instant invention can be constructed as a microelectronic circuit by forming the entire circuit on a single "chip" or block composed of semiconductor material. FIG. 7 illustrates the physical relationship between the parameters of transistor 11 and a chip 73. Collector 12, base 13 and emitter 14 are formed on chip 73. A diode junction is formed between collector 12 and chip 73. If this diode junction is forward biased, currents will flow which will disturb the entire circuit. To prevent this undesirable current flow from chip 73 to collector 12 the voltage on chip 73 must be more negative than the voltage on the collector at all times. When the −3 volt clock pulse is applied to emitter 14 of FIG. 7, the voltage on emitter 14, base 13 and collector 12 decreases to approximately −3 volts. Thus, the chip must have a negative voltage of at least a −3 volts. Due to the physical arrangement of the transistor on the chip, a distributed capacitance exists between the collector of the transistor and the chip. The diodes employed in the instant invention are also formed on chip 73. A distributed capacitance also exists between each diode and chip 73.

FIG. 8 illustrates a microcircuit embodiment of the circuit shown in FIG. 6. Distributed capacitances between chip 73 and elements which are connected to junction point 27 are represented by the dashed leads and the dashed configuration of capacitor 74. Distributed capacitances between chip 73 and elements which are connected to junction point 28 are represented by the dashed leads and the dashed configuration of capacitor 75. If the voltage on the chip is held constant, current must be supplied to charge or to discharge these capacitances each time voltage changes at the collectors of transistors 11 and 17. Inasmuch as currents $I_{11}$ and $I_{12}$ from constant current source 67 are limited, a substantial amount of time is required to either charge or discharge these capacitances. Thus, these distributed capacitances decrease the frequency at which the circuit can operate by increasing the time required to change the flip-flop from the 0-state to the 1-state or from the 1-state to the 0-state.

The maximum frequency at which the circuit can operate is increased by changing the voltage on chip 73 at the same rate as the voltage is changed at terminal 44. This can be accomplished, for example, by the addition of a capacitor 78 and an inductor 79. Capacitor 78 is connected between terminal 44 and chip 73. Inductor 79 is connected between chip 73 and a terminal 81 which is connected to a suitable source of potential such as −3 volts. Inasmuch as the charge on capacitor 78 cannot change instantaneously, the voltage pulse of terminal 44 is transmitted to chip 73. Inductor 79 prevents the voltage pulse from being transmitted to terminal 81. The voltage on chip 73 is −3 volts when no pulse is applied to terminal 44. The voltage on chip 73 changes as the voltage on terminal 44 changes.

Thus, the objects set forth herein are realized by the instant invention, wherein a novel arrangement of a flip-flop, a three-level clock signal and a source of binary data are employed to provide input gating, storage and output gating of data.

While the principles of the invention have now been made clear in an illustrative embodiment, there will be immediately obvious to those skilled in the art many modifications of structure, arrangement, proportions, the elements, materials, and components used in the practice of the invention and otherwise which are particularly adapter for specific environments and operating requirements without departing from those principles. The appended claims are therefore intended to cover and embrace any such modifications within the limits only of the true spirit and scope of the invention.

What is claimed is:

1. A memory flip-flop comprising: first and second transistors each having a base, an emitter and a collector; means for cross-coupling said first and second transistors to form a bistable switch; a source of clock pulses; means for applying said clock pulses to the emitters of said first and second transistors; a source of binary signals; and means for applying said binary signals to said collector of said first transistor.

2. A memory flip-flop comprising: first and second transistors each having a base, an emitter and a collector; means for cross-coupling said first and second transistors to form a bistable switch; a source of clock pulses; means for applying said clock pulses to the emitters of said first and second transistors; a source of binary signals; means for applying said binary signals to said collector of said first transistor; a signal output terminal; and a unidirectional conducting means, said conducting means being connected between said terminal and the collector of one of said first and second transistors.

3. A memory flip-flop comprising: first and second transistors each having a base, an emitter and a collector; means for cross-coupling said first and second transistors to form a bistable switch; a source of clock pulses; said source of pulses providing pulses having a value sufficient to render said first and second transistors nonconductive; means for applying said clock pulses to the emitters of said first and second transistors; a source of binary signals; means for applying said binary signals to said collector of said first transistor; a signal output terminal; and a unidirectional conducting means, said conducting means being connected between the collector of said first transistor and said terminal.

4. A memory flip-flop comprising: first and second transistors each having a base, an emitter and a collector; means for cross-coupling said first and second transistors to form a bistable switch; a source of three-level clock pulses; means for applying said clock pulses to the emitters of said first and second transistors; a source of binary signals; and means for applying said binary signals to said collector of said first transistor.

5. A memory flip-flop comprising: first and second transistors each having a base, an emitter and a collector; means for cross-coupling said first and second transistors to form a bistable switch; a source of three-level clock pulses; means for applying said clock pulses to the emitters of said first and second transistors; one level of said pulses having sufficient amplitude to render said first and second transistors nonconductive; a source of binary signals; and means for applying said binary signals to said collector of said first transistor.

6. A memory flip-flop comprising: first and second transistors each having a base, an emitter and a collector; means for cross-coupling said first and second transistors to form a bistable switch; a source of clock pulses; means for applying said clock pulses to said first and second transistors; a source of binary signals, said source of signals providing a signal comprising: a first voltage value to represent a binary 0 and a second voltage value to represent a binary 1; means for applying said binary signals to said collector of said first transistor; a reference voltage; said reference voltage having a value between said voltage which represents a binary 0 and said voltage which represents a binary 1; and a means for applying said reference voltage to said collector of said second transistor.

7. A memory flip-flop comprising: first and second transistors each having a base, an emitter and a collector; means for cross-coupling said first and second transistors to form a bistable switch; a source of binary signals, said source of signals providing a signal comprising: a first voltage value to represent a binary 0 and a second voltage value to represent a binary 1; means for applying said binary signals to said collector of said first transistor; a reference voltage; said reference voltage having a value between said voltage which represents a binary 0 and said voltage which represents a binary 1; and a means for applying said reference voltage to said collector of said second transistor.

8. A memory flip-flop comprising: first and second transistors each having a base, an emitter and a collector; means for cross-coupling said first and second transistors to form a bistable switch; a source of clock pulses; means for applying said clock pulses to the emitters of said first and second transistors; a source of binary signals, said source of signals providing a signal comprising: a first voltage value to represent a binary 0 and a second voltage value to represent a binary 1; means for applying said binary signals to said collector of said first transistor; a reference voltage; said reference voltage having a value between said voltage which represents a binary 0 and said voltage which represents a binary 1; and a means for applying said reference voltage to said collector of said second transistor.

9. A memory flip-flop comprising: first and second transistors each having a base, an emitter and a collector; means for cross-coupling said first and second transistors to form a bistable switch; a source of clock pulses; means for applying said clock pulses to the emitters of said first and second transistors; a source of binary signals, said source of signals providing a signal comprising: a first voltage value to represent a binary 0 and a second voltage value to represent a binary 1; means for applying said binary signals to said collector of said first transistor; a reference voltage; said reference voltage having a value substantially midway between said voltage which represents a binary 0 and said voltage which represents a binary 1; and a means for applying said reference voltage to said collector of said second transistor.

10. A memory flip-flop comprising: first and second transistors each having a base, an emitter and a collector; means for cross-coupling said first and second transistors to form a bistable switch; a source of clock pulses; means for applying said clock pulses to the emitters of said first and second transistors; a source of binary signals; and means for applying said binary signals to said collector of said first transistor; said clock pulses rendering said first and second transistors momentarily nonconducting, said signals providing a current for storing charges in one of said transistors while said transistors are nonconducting whereby said one transistor is rendered conductive.

11. A memory flip-flop comprising: first and second transistors each having a base, an emitter and a collector; means for cross-coupling said first and second transistors to form a bistable switch; a source of clock pulses; means for applying said clock pulses to the emitters of said first and second transistors; a source of binary signals; and means for applying said binary signals to said collector of said first transistor; said clock pulses rendering said first and second transistors momentarily nonconducting, said signals providing a current for storing charges in one of said transistors while said transistors are nonconducting whereby said one transistor is rendered conductive, the one transistor which becomes conductive depending upon the binary signal applied.

12. A memory flip-flop comprising: first and second transistors each having a base, an emitter and a collector; means for cross-coupling said first and second transistors to form a bistable switch; means for applying a constant current to said collector of said first transistor; means for applying a constant current to said collector of said second transistor; a source of clock pulses; means for applying said clock pulses to the emitters of said first and second transistors; a source of binary signals; means for applying said binary signals to said collector of said first transistor; a signal output terminal; and a unidirectional conducting means, said conducting means being connected between said terminal and the collector of one of said first and second transistors.

13. A memory flip-flop comprising: first and second transistors each having a base, an emitter and a collector; means for cross-coupling said first and second transistors to form a bistable switch; a reference voltage; resistive means connecting said collector of said second transistor to said voltage; a source of binary signals; resistive means connecting said collector of said first transistor to said source of signals; a source of clock pulses, said source of clock pulses providing a three-level signal comprising: a level substantially equal to a zero value, a first series of negative pulses, and a second series of positive pulses having a peak value at least as positive as any of the binary signals; means for coupling said source of clock pulses to said emitters of said first and second transistors; a signal output terminal; and means for coupling the collector of one of said first and second transistors to said terminal.

14. A memory flip-flop comprising: first and second transistors each having a base, an emitter and a collector; means for cross-coupling said first and second transistors to form a bistable switch; a source of clock pulses; means for coupling said source of clock pulses to said emitters of said first and second transistors; a reference voltage; resistive means connecting said collector of said second transistor to said voltage; a source of binary signals; resistive means connecting said collector of said first transistor to said source of signals; first and second signal output terminals; a means for coupling the collector of said first transistor to said first output terminal; and a means for coupling the collector of said second transistor to said second output terminal.

15. A memory flip-flop formed on a block of semiconductor material comprising: first and second transistors each having a base, an emitter and a collector; means for cross-coupling said first and second transistors to form a bistable switch; a source of clock pulses; means for coupling said source of clock pulses to said emitters of said first and second transistors; first and second reference voltages; means for coupling the collector of said second transistor to said first voltage; a source of binary signals; means for coupling the collector of said first transistor to said source of signals; a signal output terminal; means for coupling the collector of one of said first and second transistors to said terminal; means for coupling said second voltage to said block; and means for coupling said clock pulses to said block.

16. A memory flip-flop formed on a block of semiconductor material comprising: first and second transistors each having a base, an emitter and a collector; means for cross-coupling said first and second transistors to form a bistable switch; a source of clock pulses; means for coupling said source of clock pulses to said emitters of said first and second transistors; first and second reference voltages; means for applying a constant current to said collector of said first transistor; means for applying a constant current to said collector of said second transistor; means for coupling the collector of said second transistor to said first voltage; a source of binary signals; means for coupling the collector of said first transistor to said source of signals; a signal output terminal; means for coupling the collector of one of said first and second transistors to said terminal; means for coupling said second voltage to said block; and means for coupling said clock pulses to said block.

17. A memory flip-flop formed on a block of semiconductor material comprising: first and second transistors each having a base, an emitter and a collector; means for cross-coupling said first and second transistors to form a bistable switch; a source of clock pulses; coupling means for connecting said source of clock pulses to said emitters of said first and second transistors; first and second reference voltages; means for applying a constant current to said collector of said first transistor; means for applying a constant current to said collector of said second transistor; means for coupling the collector of said second transistor to said first voltage; a source of binary signals; means for coupling the collector of said first transistor to said source of signals; a signal output terminal; means for coupling the collector of one of said first and second transistors to said terminal; an inductor and a capacitor;

said capacitor being connected between said block and said source of pulses, said inductor being connected between said block and said second voltage.

18. A memory flip-flop formed on a block of semiconductor material comprising: first and second transistors each having a base, an emitter and a collector; means for cross-coupling said first and second transistors to form a bistable switch; a source of clock pulses; means for coupling said source of clock pulses to said emitters of said first and second transistors; first and second reference voltages; means for applying a constant current to said collector of said first transistor; means for applying a constant current to said collector of said second transistor; first, second and third diodes; said first diode being connected between the collector of said second transistor and said first voltage; a source of binary signals; said second diode being connected between the collector of said first transistor and said source of signals; a signal output terminal; said third diode being connected between said terminal and the collector of one of said first and second transistors; means for coupling said second voltage to said block; and means for coupling said clock pulses to said block

19 A memory flip-flop formed on a block of semiconductor material comprising: first and second transistors each having a base, an emitter and a collector; means for cross-coupling said first and second transistors to form a bistable switch; a source of clock pulses; means for coupling said source of clock pulses to said emitters of said first and second transistors; first, second and third reference voltages; means for applying a constant current to said collector of said first transistor; means for applying a constant current to said collector of said second transistor; first, second and third diodes; said first diode being connected between the collector of said second transistor and said first voltage; a source of binary signals; said second diode being connected between the collector of said first transistor and said source of signals; first and second resistors; a signal output terminal; said third diode being connected between the collector of said first transistor and said terminal; said first resistor being connected between said terminal and said second voltage; said second resistor being connected between said collector of said first transistor and said base of said second transistor; an inductor and a capacitor; said capacitor being connected between said block and said source of pulses, said inductor being connected between said block and said third voltage.

20. A memory flip-flop comprising: first and second transistors each having a base, an emitter and a collector; means for cross-coupling said first and second transistors to form a bistable switch; a reference voltage; resistive means connecting said collector of said second transistor to said voltage; a signal output terminal; a means for coupling said collector of said first transistor to said terminal; a source of binary signals; resistive means connecting said collector of said first transistor to said source of signals; a source of clock pulses; and means for coupling said source of clock pulses to said emitters of said first and second transistors; said clock pulses rendering said first and second transistors momentarily nonconducting, said signals providing a current for storing charges in one of said transistors while said transistors are nonconducting, whereby the transistor with charges stored conducts.

21. A memory flip-flop comprising: first and second transistors each having a base, an emitter and a collector;

means for cross-coupling said first and second transistors to form a bistable switch; means for applying a constant current to said collector of said first transistor; means for applying a constant current to said collector of said second transistor; a source of binary signals, said source of signals providing a signal comprising: a first voltage value to represent a binary 0 and a second voltage value to represent a binary 1; first and second reference voltages; said first reference voltage having a value substantially midway between said voltage which represents a binary 0 and said voltage which represents a binary 1; first, second and third diodes; said first diode being connected between the collector of said second transistor and said first reference voltage; first and second resistors; a signal output terminal; said second diode being connected between the collector of said first transistor and said terminal; said first resistor being connected between said terminal and said second reference voltage; said second resistor being connected between said collector of said first transistor and said base of said second transistor; said third diode being connected between the collector of said first transistor and said source of signals; a source of clock pulses, said source of clock pulses providing a three-level signal comprising: a level substantially equal to said second reference voltage, a first series of negative pulses, and a second series of positive pulses having a peak value at least as positive as any of the binary signals; and means for coupling said source of clock pulses to said emitters of said first and second transistors; said clock pulses rendering said first and second transistors momentarily nonconducting, said signals providing a current for storing charges in one of said transistors while said transistors are nonconducting, whereby the transistor with charges stored is rendered conductive

22. A memory flip-flop comprising: first and second transistors each having a base, an emitter and a collector; means for coupling said collector of said first transistor to said base of said second transistor; means for coupling said collector of said second transistor to said base of said first transistor; a source of clock pulses; means for applying said clock pulses to the emitters of said first and said second transistors; a source of binary signals; and means for applying said binary signals to said collector of said first transistor.

23. A memory flip-flop comprising: first and second transistors each having a base, an emitter and a collector; means for coupling said collector of said first transistor to said base of said second transistor; means for coupling said collector of said second transistor to said base of said first transistor; a source of three level clock pulses; means for applying said clock pulses to the emitters of said first and second transistors; a source of binary signals; and means for applying said binary signals to said collector of said first transistor.

References Cited

UNITED STATES PATENTS

| | | | |
|---|---|---|---|
| 2,888,580 | 5/1959 | Wanlass | 307—88.5 |
| 2,991,374 | 7/1961 | Miranda et al. | 307—88.5 |
| 3,173,028 | 3/1965 | Philips et al. | 307—88.5 |

ARTHUR GAUSS, *Primary Examiner.*

B. P. DAVIS, *Assistant Examiner.*

U.S. Cl. X.R.

307—291; 303—303; 328—196